United States Patent [19]
Suzuki

[11] Patent Number: 5,381,532
[45] Date of Patent: Jan. 10, 1995

[54] MICROPROCESSOR HAVING BRANCH ALIGNER BETWEEN BRANCH BUFFER AND INSTRUCTION DECODER UNIT FOR ENHANCING INITIATION OF DATA PROCESSING AFTER EXECUTION OF CONDITIONAL BRANCH INSTRUCTION

[75] Inventor: Nariko Suzuki, Tokyo, Japan
[73] Assignee: NEC Corporation, Tokyo, Japan
[21] Appl. No.: 227,692
[22] Filed: Apr. 14, 1994

Related U.S. Application Data

[63] Continuation of Ser. No. 573,944, Aug. 28, 1990, abandoned.

[30] Foreign Application Priority Data

Aug. 28, 1989 [JP] Japan .................. 1-222058

[51] Int. Cl.6 ............ G06F 9/30; G06F 9/38
[52] U.S. Cl. .................. 395/375; 395/800;
395/250; 364/261.3; 364/261.4; 364/261.5;
364/261.9; 364/261.7; 364/263.1; 364/263.3;
364/DIG. 1
[58] Field of Search .......... 395/375, 250, 800;
364/261.3, 261.4, 261.5, 261.9, 261.7, 263.1,
263.3

[56] References Cited

U.S. PATENT DOCUMENTS

| | | | |
|---|---|---|---|
| 4,454,578 | 6/1984 | Matsumoto et al. | 395/375 |
| 4,725,947 | 2/1988 | Shonai et al. | 395/375 |
| 4,853,840 | 8/1989 | Shibuya | 395/375 |
| 4,881,170 | 11/1989 | Morisada | 395/375 |
| 4,893,234 | 1/1990 | Davidson et al. | 395/375 |
| 4,974,154 | 11/1990 | Matsuo | 395/375 |
| 4,984,154 | 1/1991 | Hanatani et al. | 395/375 |
| 4,992,932 | 2/1991 | Oshima | 395/375 |
| 5,113,515 | 5/1992 | Fite et al. | 395/425 |
| 5,142,634 | 8/1992 | Fite et al. | 395/375 |

FOREIGN PATENT DOCUMENTS

| | | |
|---|---|---|
| 0162778 | 11/1985 | European Pat. Off. . |
| 61-262849 | 11/1986 | Japan . |
| 1073423 | 3/1989 | Japan . |

OTHER PUBLICATIONS

H. Matsumoto et al, "A High-Performance Architecture for Variable Length Instructions", Systems & Computers in Japan, No. 3, May 1985, New York, N.Y., pp. 19-28.

*Primary Examiner*—Alyssa H. Bowler
*Assistant Examiner*—Dzung C. Nguyen
*Attorney, Agent, or Firm*—Sughrue, Mion, Zinn, Macpeak & Seas

[57] ABSTRACT

A microprocessor for enhancing the initiation of data processing after execution of a conditional branch instruction, by decoding a branch target instruction immediately when a branch is taken. An instruction prefetch cycle for a branch target instruction is initiated before the execution of a conditional branch is completed and by utilizing the branch address the byte data to be outputted from a branch buffer is selected and transferred to the instruction decoder.

4 Claims, 5 Drawing Sheets

MICROPROCESSOR HAVING BRANCH ALIGNER BETWEEN BRANCH BUFFER AND INSTRUCTION DECODER UNIT FOR ENHANCING INITIATION OF DATA PROCESSING AFTER EXECUTION OF CONDITIONAL BRANCH INSTRUCTION

This is a continuation of application No. 07/573,944 filed Aug. 28, 1990, now abandoned.

BACKGROUND OF THE INVENTION

The present invention relates to a microprocessor and, more particularly, to an improvement in an instruction prefetch unit of a pipelined microprocessor.

An instruction prefetch function and a pipeline processing function are widely used to enhance the program execution efficiency of a microprocessor. However, when the microprocessor encounters a conditional branch instruction, the execution efficiency thereof is often lowered remarkably. Specifically, the conditional branch instruction is used to control or change the instruction stream in accordance with whether or not a branch condition designated by the conditional branch instruction is coincident with a current processor execution state which may be changed by the execution of an instruction before the conditional branch instruction. Therefore, whether the branch is taken is unknown before the processor execution state is settled. In other words, even if the conditional branch instruction is decoded, the execution thereof is awaited until the processor execution state is settled. Before the execution of the conditional branch instruction, one or more instructions subsequent to that branch instruction are prefetched by the instruction prefetch operation. These instructions thus prefetched are executed as valid instructions when the branch is not taken. On the other hand, when the branch is taken, the prefetched instructions become invalid instructions. An instruction at a branch address (called hereinafter "branch target instruction") has to be fetched newly. A pipelined operation is thereby brought to a halt.

In order to solve this drawback, therefore, such a construction has been proposed that not only the instruction subsequent to the conditional branch instruction but also the branch target instruction are prefetched before the branch is determined to have been taken and one of them is selected to be executed in accordance with whether the branch was taken. According to this construction, even if the branch was taken, the branch target instruction has been already prefetched, so that the program execution efficiency can be enhanced.

However, the following problem is raised in a recent high performance microprocessor. Specifically, a microprocessor generally performs a data processing operation in units of words. The instruction prefetch operation is also performed in units of words. In a recent high performance microprocessor, the bit length of one word is expanded. For example, assuming that one word is constructed of 32 bits, the instruction data would be fetched in 4-byte units per one prefetch operation. The fact that the instruction prefetch operation is performed in 4-byte units means that the contents of the least significant two bits (including the least significant bit) of a memory access address are disregarded. That is, the prefetch operation for the branch target instruction is performed by disregarding the contents of the least significant two bits of the branch address. On the other hand, the byte length of respective instructions including the branch target instruction is not constant, but is changed independent on the required data processing operation and/or the addressing mode of operand data. For this reason, the leading byte of an instruction is not always coincident with the word boundary. Thus, the leading byte of the branch target instruction is often different from the first byte of the four bytes fetched in fact by the prefetch operation for the branch target instruction.

An instruction includes an operation code (called hereinafter "OP-code") field and one or two operand fields, in general. The OP-code field is decoded by an OP-code field decoder of an instruction decoder unit and then supplied to an execution unit. On the other hand, the operand field is decoded by an addressing field decoder of the decoder unit and then supplied to an operand access unit. Therefore, it is required to detect whether the OP-code field and the operand field of the branch target instruction are supplied to the corresponding decoders of the instruction decoder unit, because of the fact that the leading byte of the branch target instruction is not always coincident with the first byte of the actually fetched four bytes. As a result, the initiation in decoding of the branch target instruction is delayed.

SUMMARY OF THE INVENTION

Therefore, an object of the present invention is to provide a microprocessor in which the decoding of a branch target instruction is initiated immediately when a branch is taken.

Another object of the present invention is to provide a microprocessor having an improved instruction prefetch unit.

A microprocessor according to the present invention comprises prefetch means for initiating an instruction prefetch cycle for a branch target instruction before the execution of a conditional branch instruction is completed and for fetching instruction data of a plurality of bytes, a branch buffer for temporarily storing the fetch instruction data having a plurality of bytes, means responsive to information of least significant bit or bits of a branch address for selecting a byte or bytes to be outputted from the branch buffer, and means for transferring the selected byte or bytes to an instruction decoder unit when a branch is taken.

Thus, by utilizing the branch address, the byte data to be outputted from the branch buffer are selected and if the branch is taken, the selected byte data are transferred to the instruction decoder. Accordingly, the byte data to be transferred to the decoder are already determined at a time when the branch is settled to be taken, so that the decoding operation of the branch target instruction can be initiated immediately.

BRIEF DESCRIPTION OF THE DRAWINGS

The above and other objects, advantages and features of the present invention will be more apparent from the following description taken in conjunction with the accompanying drawings, in which.

DETAILED DESCRIPTION OF THE EMBODIMENTS

Figure 1:
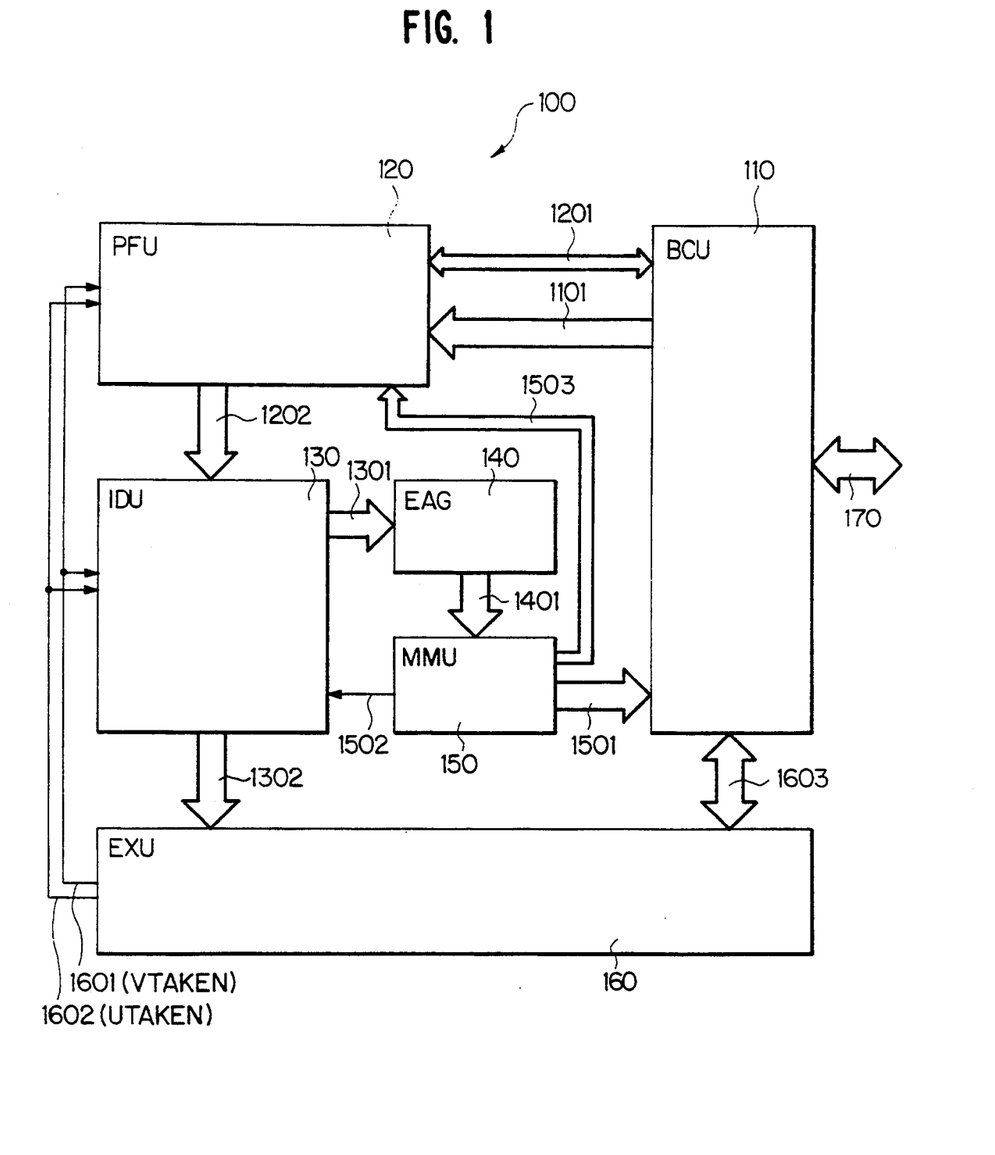
FIG. 1 is a block diagram representative of an embodiment of the present invention.

Referring now to FIG. 1, a microprocessor 100 according to an embodiment of the present invention includes a bus control unit (BCU) 110 which initiates bus cycles on a system bus 170 coupled to a memory and peripheral I/O units (not shown) and fetches instructions and reads and writes data. The instructions thus fetched are supplied through a bus 1101 to an instruction prefetch unit (PFU) 120 and temporarily stored therein. PFU 120 and BCU 110 transfer via a control bus 1201 therebetween control data including an instruction prefetch request, an acknowledge signal responsive to such request and so forth. The instruction from PFU 120 is transferred to an instruction decoder unit (IDU) 130 via a bus 1202. IDU 130 decodes the instruction supplied thereto and generates data processing information for executing the instruction and operand access information for accessing operand data. The data processing information is supplied via a bus 1302 to an instruction execution unit (EXU) 160, and the operand access information is supplied via a bus 1301 to an effective address generator (EAG) 140. EAG 140 calculates and produces an effective address in response to the operand access information 1301 and supplies it to a memory management unit (MMU) 150 via a bus 1401. MMU 150 translates the effective address into a real address and then requests an operand access to BCU 110 through a bus 501. MMU 150 further informs IDU 130 of the completion of the address translation by a signal 1502. EXU 160 executes the instruction in response to the information from IDU 130 by receiving or supplying operand data from or to BCU 110. In the execution of a conditional branch instruction, when a branch condition of that instruction is satisfied, i.e. when a branch is settled has taken, a branch-enable signal (VTAKEN) 1601 is changed to an active level. On the other hand, when the branch condition is not satisfied, i.e. when a branch is determined not to be taken, a branch-disenable signal (UTAKEN) 1602 is changed to an active level. These signals 1601 and 1602 are supplied to PFU 120 and IDU 130. Further, MMU 150, when producing a branch address responsive to a conditional branch instruction for accessing an instruction at the branch address, i.e. a branch target instruction, supplies the information of the two least significant bits (including the least significant bit) of the branch address to PFU 120. The above respective units operate in a predetermined pipelined manner.

In the microprocessor 100 of the present embodiment, one word is constructed of 32-bit, i.e., 4-byte. Therefore, the instruction data of 4-byte length are fetched simultaneously by one instruction prefetch operation and then transferred to PFU 120 through the instruction bus 1101 of 4-byte length. On the other hand, in a memory storing instruction data and operand data, a unique address is alloted to one byte data. Accordingly, the fetching of the instruction data of 4-byte length by one prefetch operation means that the memory access is performed by disregarding the contents of the two least significant bits (LSB and LSB+1) of the memory address.

Figure 2:
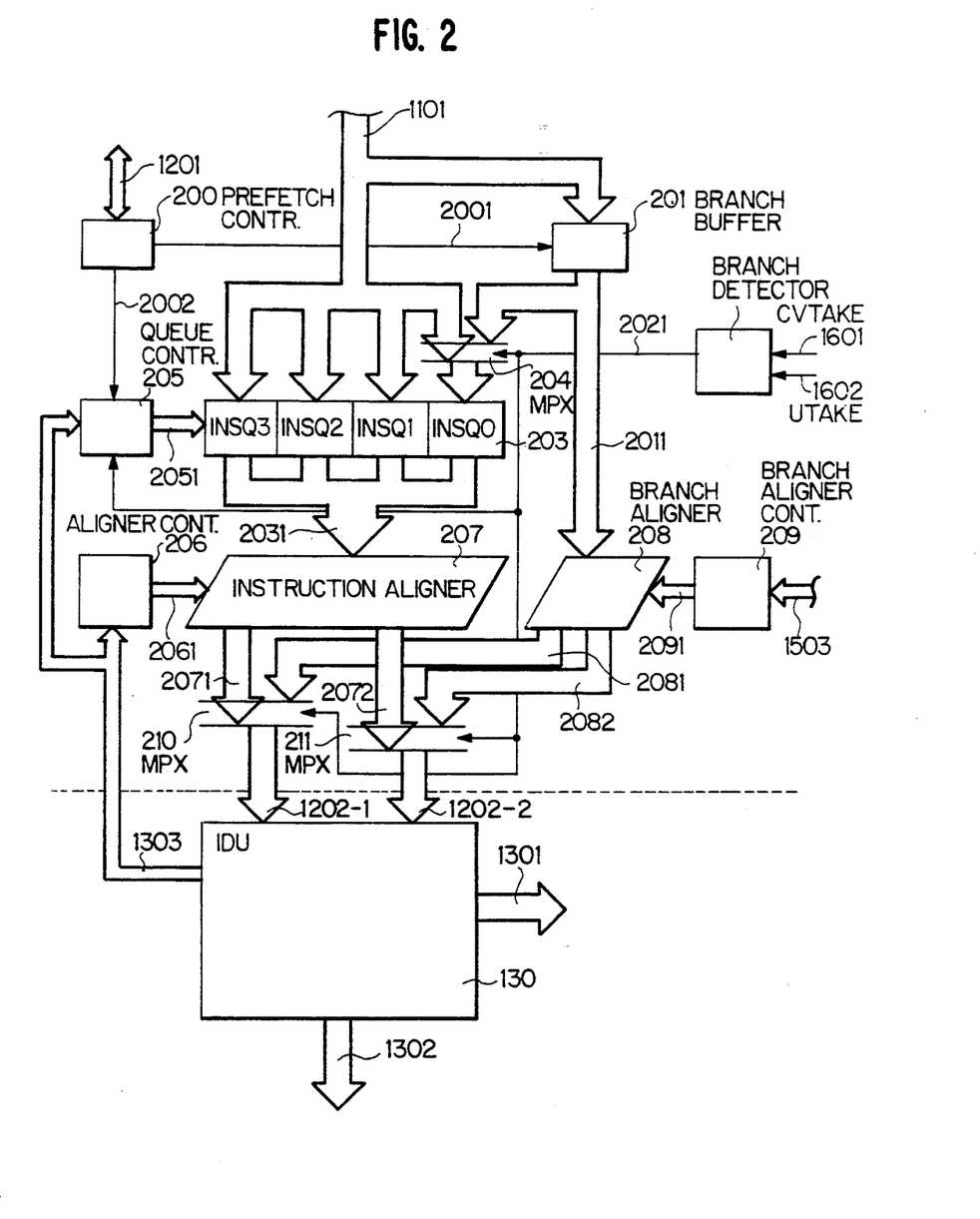
FIG. 2 is an internal block diagram representative of a PFU shown in FIG. 1.

Turning the FIG. 2, PFU 120 includes an instruction queue 203 having four pockets INSQ0 to INSQ3. Each of the instruction queue pockets INSQ0- 3 has a 4-byte memory capacity. The bus 1101 is coupled in common to the second to fourth queue pockets INSQ1- 3. On the other hand, the first queue pocket INSQ0 is coupled to the output of a multiplexer (MPX) 204, having a first input coupled to the bus 1101 and a second input coupled to a branch buffer 201. MPX 204 selects the branch buffer 201 when a branch detection signal 2021 is "1", whereas it selects the bus 1101 when the signal 2021 is "0". This signal 2021 is controlled by a branch detector 202 so as to take "0" when both of VTAKEN 1601 and UTAKEN 1602 are in the inactive level or UTAKEN 1602 is in the active level and to take "1" when VTAKEN 1601 is in the active level. Therefore, MPX 204 selects the branch buffer 201 only when a branch responsive to a conditional branch instruction is taken. The buffer 201 also has a 4-byte memory capacity. The instruction data on the bus 1101 is stored in one of the queue pockets INSQ0 - 3 selected by queue pointer information 2051 from a queue controller 205. A prefetch controller 200 performs a whole control operation of PFU 120 by receiving or supplying control information from or to BCU 110. In particular, when BCU 110 informs PFU 120 via the control bus 1201 of the fact that the instruction data responsive to a prefetch operation for a conditional branch instruction have been prefetched and transferred onto the bus 1101, the prefetch controller 200 makes a signal 2001 active to store the prefetched instruction data into the branch buffer 201. As to the instruction data by the prefetch operation other than the conditional branch instruction, the controller 200 makes a signal 2002 active. In response thereto, the queue controller 205 controls the contents of the pointer information 2051 to select the queue pockets INSQ0 to INSQ3 in that order.

The instruction data stored in the queue pockets INSQ0 to INSQ3 are tied up as instruction data of 16-byte length and supplied to an instruction aligner 207 via a bus 2031. This aligner 207 selects and outputs one or more byte data from the 16-byte instruction data in response to aligning pointer information 2061 from an aligner controller 206. Specifically, an operation required by an instruction to be executed is performed with one operand data or two operand data. In addition, an abundance of addressing modes are supported on respective operand data. On the other hand, IDU 130 includes an operation code (OP-code) field decoder for generating data processing information 1302 to be supplied to EXU 160 and an operand field decoder for generating operand access information 1301 to be supplied to EAG 140. It is therefore required that the respective fields of an instruction to be executed are supplied to the corresponding decoders of IDU 130. For this purpose, the instruction aligner 207 responds to the pointer information 2061 and supplies the operand field data of the 16-byte instruction data on the bus 2031 to the operand field decoder of IDU 130 via buses 2071 and 1201-1 and the OP-code field data thereof to the OP-code field decoder of IDU 130 via buses 2072 and 1202-2. IDU 130 supplies the aligner controller 206 with information 1303 representing which byte or bytes are to be selected from the data on the bus 2031, so that the contents of the information 2061 is controlled accordingly. The information 1303 is further supplied to the queue controller 205, so that the controller detects the queue pocket or pockets INSQ from which the data have been supplied to IDU 130, and new instruction data thus being stored into the detected pocket or pockets INSQ.

The instruction data of 4-byte length stored in the branch buffer 201 are supplied on a bus 2011 to a branch aligner 208 which also has an OP-code field output bus 2082 and an operand field output bus 2081. This aligner 208 responds to aligning information 2091 from a branch aligner controller 209 and controls the data on the bus 2011 to be outputted to the buses 2081 and 2082, respectively. The pointer information 2091 is generated by the controller 209 in response to the information 1503 from MMU 150.

PFU 120 further includes two multiplexers (MUXs) 210 and 211. When the signal 2021 from the detector 202 takes "0", MUXs 210 and 211 connect the buses 2071 and 2072 to the buses 1202-1 and 1202-2, respectively. On the other hand, when the signal 2021 is "1", the MUXs 210 and 211 select the buses 2081 and 2082, respectively.

Figure 3:
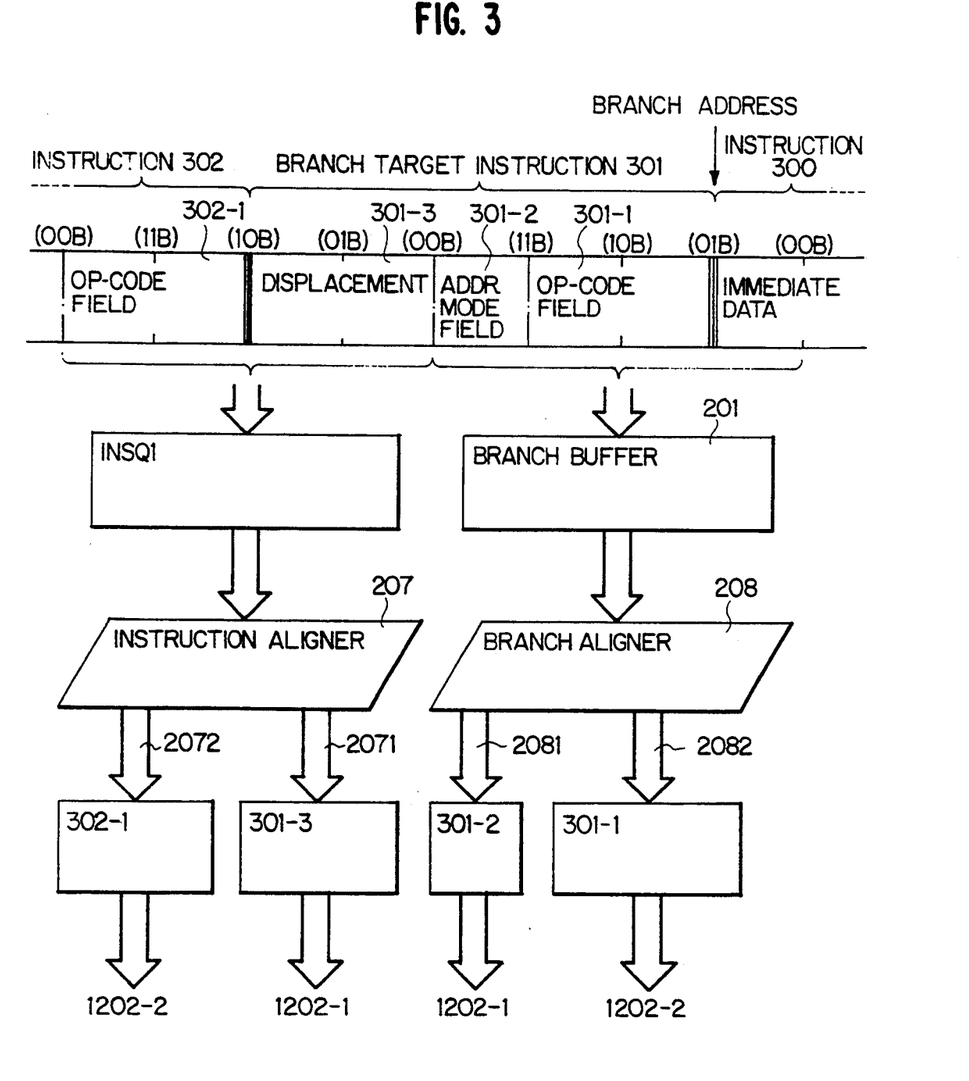
FIG. 3 is an operation diagram for explaining an operation of the circuit shown in FIG. 2.

Next, an operation after IDU 130 receives a conditional branch instruction will be described below with reference to FIGS. 1 and 2 and also to FIG. 3. When IDU 130 receives and decodes the conditional branch instruction, it supplies EXU 160 with the information 1302 representative of a branch condition and EAG 140 with the information 1301 for generating a branch address. At this time, if EXU 160 is in a busy state due to a fact that it is executing an instruction preceding the conditional branch instruction, such as a multiplication instruction or a division instruction in which a relatively long execution time is required, the detection of whether the branch condition is satisfied. Since the respective units operate in a pipelined manner, one or more instructions succeeding to the conditional branch instruction are prefetched and temporarily stored in the instruction queue (INSQ) 203.

On the other hand, MMU 150 produces *a branch address and hence requests BCU 110 to prefetch a branch target instruction. Further, MMU 150 supplies the aligner control 209 of PFU 120 with the information 1503 representative of the contents of the two least significant bits of the branch address. Assuming that the branch address is "XX . . . . . . X001B" ("B" indicating a binary notation), the data "01B" is supplied to the controller 209 as the information 1503. In response to the request from MMU 150, BCU 110 initiates a bus cycle for fetching the branch target instruction. It should be noted, however, that BCU 110 performs the instruction fetch cycle by disregarding the contents of the two least significant bits of the branch address, as mentioned herebefore. As a result, the instruction data of 4-byte length stored at the addresses "XX ...... XX000B" to "XX ...... 011B" are fetched as shown in FIG. 3. These 4-byte instruction data are transferred via the bus 1101 to PFU 120. At this time, the signal 2001 is mode active, so that the 4-byte instruction data thus prefetched are stored into the branch buffer 201. Thus, buffer 201 stores a part (one byte) of immediate data of an instruction 300 before the branch target instruction 301, an OP-code field 301-1 (two bytes) of the branch target instruction 301 and an addressing mode field 301-2 (one byte) thereof. Since the branch aligner control 209 receives the information 1503 of "01B", it judges that the first byte data of the data stored in the branch buffer 201 is not valid, i.e. that the first byte does not belong to the branch target instruction 301. The controller 209 thus controls the contents of pointer information 2091 such that the branch aligner 208 outputs the OP-code field 301-1 and the addressing mode field 301-2 onto the buses 2082-2 and 2082-1, respectively. The number and position of the data to be outputted from the buffer 201 by the aligner 208 depends on the contents of the information 503.

When EXU 160 completes the execution of the current instruction, it starts to detect whether the branch condition is satisfied. Assuming that the branch condition is satisfied, VTAKEN 1601 is changed to the active level to inform PFU 120 of the fact that a branch has to be taken. In response thereto, the branch detector 202 outputs the signal 2021 of "1". MUXs 211 and 210 thereby connect the output buses 2082 and 2081 of the branch aligner 208 to the buses 1202-2 and 1202-1 leading to IDU 130, respectively. Thus, the OP-code field 301-1 and the addressing mode field 301-2 of the branch target instruction 301 are supplied to the corresponding decoder portions of IDU 130. The decoding operation for the branch target instruction 301 is thereby initiated. By the signal 2021 of "1", MUX 204 selects the branch buffer 201, and the queue controller 205 causes the queue pocket INSQ0 to store the content of the buffer 201. Further, the queue controller 205 resets the queue pockets INSQ1 to INSQ3 to invalidate the instruction data which have already stored therein. Since the branch is settled to be taken by VTAKEN 1601, an instruction prefetch operation is performed for instruction data succeeding to the data which have been already prefetched. Consequently, 4-byte instruction data stored at the addresses "XX . . . X100B" to "XX . . . . . . X111B" are fetched and stored into the queue pocket INSQ1. The first and second byte data of the instruction data thus fetched corresponds to displacement data 301-3 for an operand access of the branch target instruction 301 and the third and fourth byte data thereof corresponds to an OP-code field 302-1 of a next instruction 302. IDU 130 decodes the OP-code field 301-1 and the addressing mode field 301-2 of the branch target instruction 301 and judges that this instruction 301 is a one-operand instruction and has an operand addressing mode of a displacement mode having 2-byte displacement data. Therefore, IDU 130 commands the aligner controller 206 to select the first and second byte data from the data of the queue pocket INSQ1. Since the signal 2021 is changed to "0" after the branch is taken, the displacement data 301-3 of the branch target instruction 301 is supplied to IDU 130 via the buses 2071 and 1202-1. As a result, the IDU 130 generates the information 1301 and 1302 for executing the branch target instruction 301 and supplies them to EAG 140 and EXU 160. Thereafter, the OP-code field 302-1 of the next instruction 302 is supplied to IDU 130 via the buses 2072 and 1202-2. Although the branch target instruction 301 has a 5-byte length in FIG. 3, it may have a 2-byte or a 3-byte length. In that case, a part of an instruction next to the branch target instruction is first stored in the branch buffer 201 and then stored in the queue pocket INSQ0. That part of the instruction is thereafter used for decoding the instruction next to the branch target instruction.

On the other hand, if EXU 160 detects that the branch condition is not satisfied, it changes UTAKEN 1602 to the active level. As a result, the instruction data, which has already been stored in the queue pockets INSQ, are supplied to IDU 130. An instruction next to the conditional branch instruction is started to be decoded.

As described above, the decoding of the branch target instruction is initiated immediately when the branch is taken, even if the instruction data not belonging to the branch target instruction is prefetched and held.

Figure 4:
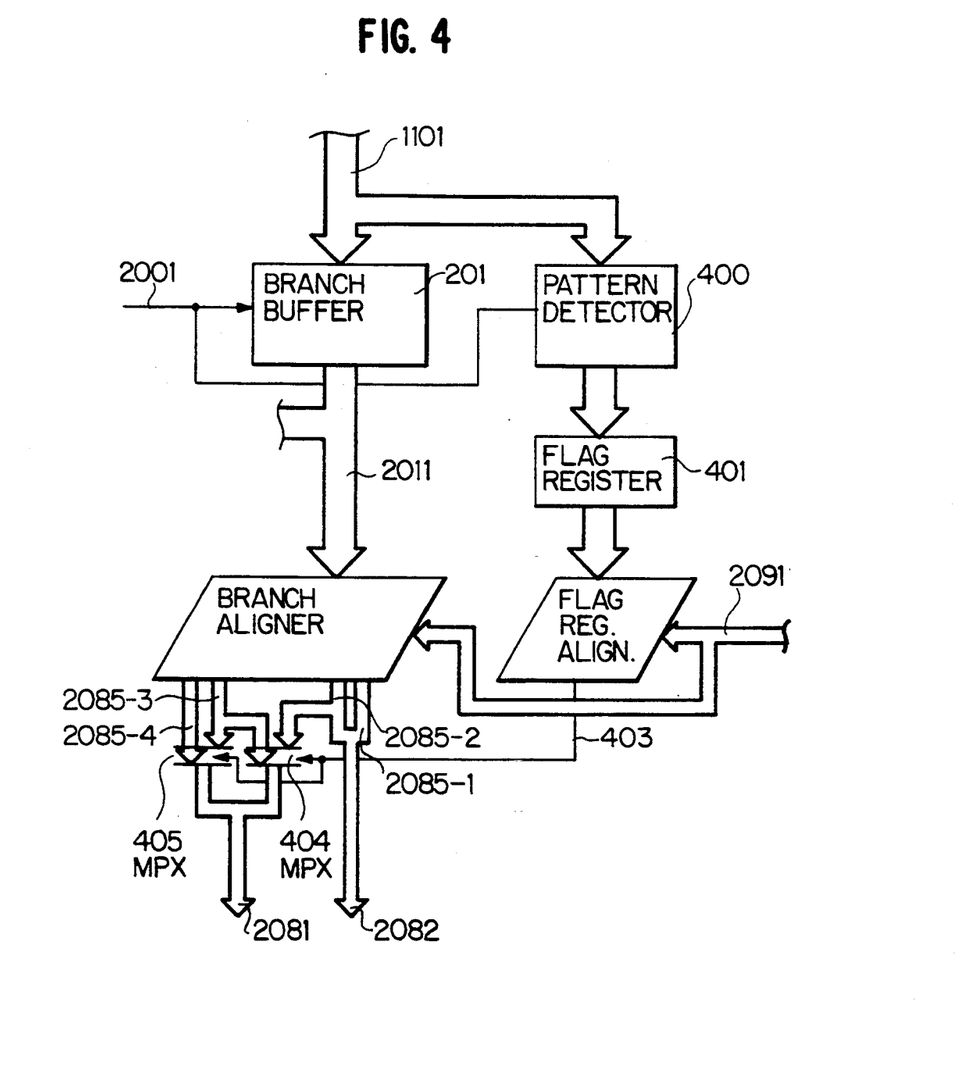
FIG. 4 is a block diagram representative of a part of a PFU according to another embodiment of the present invention.

There is an instruction which has an OP-code of one-byte length. If such a instruction is programmed as a branch target signal using, the circuit construction shown in FIG. 2, a part of an operand field of the branch target instruction is not transferred onto the bus 1202-1 through the branch aligner 208. In such a case, the queue pocket INSQ0 has to be used, so that the decoding time is more or less prolonged. A circuit construction for solving such a program is shown in FIG. 4 as another embodiment, wherein the same constituents as those shown in FIG. 2 are denoted by the same reference numerals to omit the further description thereof.

In this embodiment, an instruction having an OP-code of one-byte length is distinguished from the other type of instruction in that the three most significant bits of the OP-code are all "1". Specifically, a pattern detector 400 is provided to be coupled to the bus 1101. This detector 400 is activated when the store command signal 2001 to the branch buffer 201 is generated, and judges the contents of the three most significant bits of each byte data. When those three bits are all "1", the detector 400 sets the corresponding bit in a flag register 401 of a 4-bit construction to "1". On the other hand, at least one bit of those three bits is "0", the corresponding bit of the register 401 is reset to "0". The content of the register 401 is supplied to a flag register aligner 402. This aligner 402 responds to the pointer information 2091 and output the bit data of the register 401 as output data 403, which corresponds to the least significant byte data that is outputted from the branch aligner 208. The branch aligner 208 has in detail four buses 2085-1 to 2085-4 for outputting four byte data, respectively, as shown in FIG. 4. The buses 2085-1 and 2085-2 are tied up as the OP-code field output bus 2082. The buses 2085-2 and 2085-3 are coupled to a multiplexer (MUX) 404, and the buses 2085-3 and 2085-4 are coupled to a multiplexer (MUX) 405. The outputs of MPXs 404 and 405 are tied up to the operand field output bus 2081. MUXs 404 and 405 select the buses 2085-2 and 2085-3 when the data 403 is "1", respectively, and select the buses 2085-3 and 2085-4 when the data 403 is "0".

Figure 5:
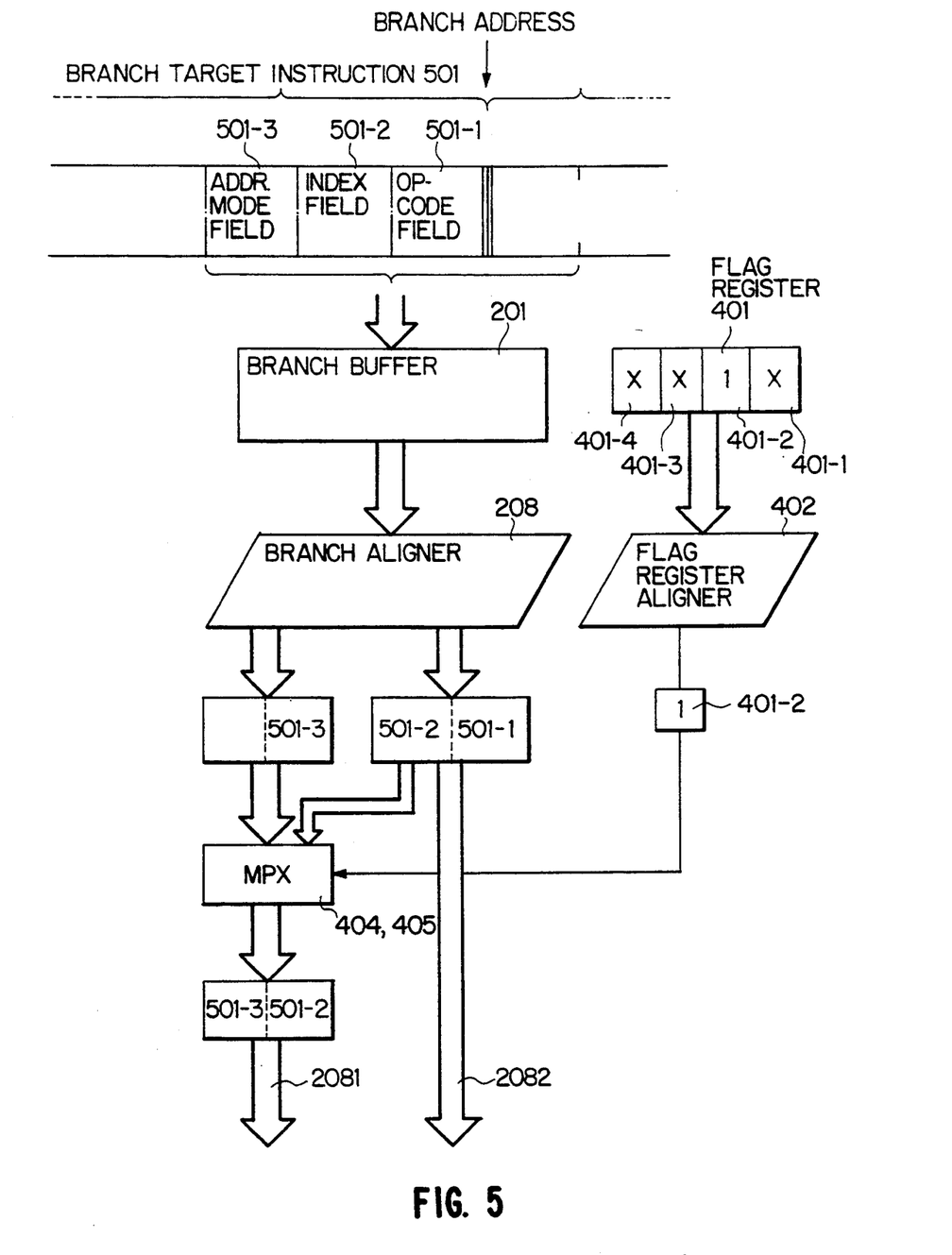
FIG. 5 is an operation diagram for explaining an operation of the circuit shown in FIG. 4.

Assuming that the branch target instruction 501 has its OP-cbde field 501-1 of one-byte length and the address thereof is "XX......XX01B", as shown in FIG. 5, the branch buffer 201 stores a part of an instruction before the instruction 501 and three fields 501-1 to 501-3 of the instruction 501, as mentioned above. At this time, the data of the flag register 401 is "XX1X" in which at least the second bit 401-2 is set to "1" by the pattern detector 400. When the branch is taken by the active level of VTAKEN 1601, the fields 501-1, 501-2, and 501-3 of the branch target instruction 501 appear on the buses 2085-1, 2085-2, and 2085-3 of the branch aligner 208, respectively, and the data "1" of the second flag bit 401-2 appears at the output of the aligner 402 as the data 403. Accordingly, the fields 501-1 and 501-2 are outputted onto the bus 2082 and the fields 501-2 and 501-3 are outputted onto the bus 2081 via MPXs 404 and 405. Thus, the index field 501-2 and the addressing mode field 501-3 as an operand field of the branch target instruction 501 are supplied at the same time to the operand field decoder portion of IDU 130. The field data 501-2 supplied to the OP-code field decoder part of IDU 130 is processed as no-meaning data.

The present invention is not limited to the above embodiments, but may be changed and modified without departing from the scope and spirit of the invention. For example, the branch buffer can have a larger memory capacity such as 8-bytes or 16-bytes. When one word is constructed of 16-bits, the least significant bit of the branch address is used for the information.

What is claimed is:

1. A microprocessor comprising:

a memory;

an instruction bus;

instruction prefetch means, coupled to said memory, for prefetching instruction codes from said memory and for transferring prefetched instruction codes onto said instruction bus, said prefetched instruction codes including a conditional branch instruction code, said instruction prefetch means further performing, in response to a branch target instruction prefetch request, a branch target instruction prefetch operation for prefetching a branch target instruction code from a branch address of said memory and transferring said branch target instruction code onto said instruction bus, said branch target instruction code including first instruction data belonging to a branch target instruction and second instruction data belonging to an instruction other than said branch target instruction;

decoding means, coupled to said instruction prefetch means, for receiving said prefetched instruction codes, for producing decoded instruction information in response to said prefetched instruction codes, for receiving said conditional branch instruction code and for producing address information indicative of said branch address and branch condition information indicative of a branch condition of said conditional branch instruction;

execution means, coupled to said instruction prefetch means and said decoding means, for executing an instruction in response to said decoded instruction information, for responding to said branch condition information to determine whether said branch condition is satisfied and for producing a branch execution signal when said branch condition is satisfied; and generating means, coupled to said decoding means and responsive to said address information, for generating and supplying said branch target instruction prefetch request to said instruction prefetch means, and for generating less significant bit data of said branch address in response to said address information;

said instruction prefetch means comprising:

a first buffer coupled to said instruction bus;

a second buffer coupled to said instruction bus;

means for controlling said first buffer to temporarily store said prefetched instruction codes;

means for controlling said second buffer to temporarily store said branch target instruction code;

aligner means, coupled to said second buffer and said generating means and responsive to said less significant bit data generated by said generating means, for outputting said first instruction data and for preventing said second instruction data from being output when said branch condition is satisfied;

gate means coupled between said aligner means and said decoding means; and means, coupled to said decoding means and said execution means and responsive to said branch execution signal, for altering a state of said gate means from a closed state to an open state for immediately transferring said first instruction data from said aligner means to said decoding means when said branch condition is satisfied, said gate means being maintained in said closed state when said branch execution signal is not generated.

2. The microprocessor as claimed in claim 1, wherein said gate means comprises a multiplexer having a first input coupled to said first buffer, a second input coupled to said aligner means and an output coupled to one of said recording means, said gate means selecting said first input when said first buffer is coupled to said decoder means during said closed state and said second input when said aligner means is coupled to said decoding means.

3. A microprocessor comprising:
a memory;
an instruction bus;
instruction prefetching means, coupled to said memory, for prefetching instructions from said memory and for transferring prefetched instructions onto said instruction bus, said prefetched instructions including a conditional branch instruction, wherein said instruction prefetching means is further provided for performing a branch target instruction prefetch operation, in response to a branch target instruction prefetch request, for prefetching a branch target instruction at a branch address of said memory, said branch target instruction being transferred onto said instruction bus;

decoding means, coupled to said instruction prefetching means, for receiving said prefetched instructions, for producing decoded instruction information in response to said prefetched instructions, for receiving said conditional branch instruction and for producing address information indicative of said branch address and branch condition information indicative of a branch condition of said conditional branch instruction;

execution means, coupled to said instruction prefetching means and said decoding means, for executing said prefetched instructions in response to said decoded instruction information, for responding to said branch condition information to determine whether said branch condition of said conditional branch instruction is satisfied and for producing a branch execution signal when said branch condition is satisfied;

said instruction prefetching means comprising:
a first buffer coupled to said instruction bus;
a second buffer coupled to said instruction bus;
means for controlling said first buffer to temporarily store said prefetched instructions including said conditional branch instruction;
means for controlling said second buffer to temporarily store said branch target instruction;
gate means coupled between said first buffer and said second buffer;
said decoding means receiving said prefetched instructions and said conditional branch instruction from said first buffer; and
means, responsive to said branch execution signal, for altering a state of said gate means from a closed state to an open state for transferring said branch target instruction from said second buffer to said first buffer, said gate means being maintained in said closed state when said branch execution signal is not produced; and
means, coupled to said instruction prefetching means and said decoding means and responsive to said address information, for generating and supplying said branch target instruction prefetch request to said instruction prefetching means.

4. The microprocessor as claimed in claim 3, wherein said first buffer comprises a plurality of buffer stages for temporarily storing said prefetched instructions; and wherein said gate means comprises a multiplexer having a first input connected to said instruction bus, a second input connected to said second buffer and an output connected to one of said buffer stages, said gate means selecting said first input when said instruction bus is coupled to one of said buffer stages during said closed state and said second input when said second buffer is coupled to one of said buffer stages during said open state.

* * * * *

UNITED STATES PATENT AND TRADEMARK OFFICE
CERTIFICATE OF CORRECTION

PATENT NO.   : 5,381,532
DATED        : January 10, 1995
INVENTOR(S)  : Nariko Suzuki It is certified that error(s) appears in the above-identified patent and that said Letters Patent is hereby corrected as shown below:

Col. 3, line 35, delete "501" and insert --1501--.

Col. 9, line 17, delete "recording" and insert --decoding--.

Signed and Sealed this

Ninth Day of May, 1995

Attest:

BRUCE LEHMAN

*Attesting Officer*　　　　*Commissioner of Patents and Trademarks*